(12) United States Patent
Chen

(10) Patent No.: US 8,408,094 B2
(45) Date of Patent: Apr. 2, 2013

(54) QUICK RELEASE DEVICE

(76) Inventor: Chung-I Chen, Taichung (TW)

( * ) Notice: Subject to any disclaimer, the term of this patent is extended or adjusted under 35 U.S.C. 154(b) by 8 days.

(21) Appl. No.: 13/291,104

(22) Filed: Nov. 8, 2011

(65) Prior Publication Data
US 2012/0055282 A1 Mar. 8, 2012

Related U.S. Application Data

(63) Continuation-in-part of application No. 12/404,330, filed on Mar. 15, 2009, now abandoned.

(51) Int. Cl.
*B62M 3/00* (2006.01)
(52) U.S. Cl. .......................................... 74/594.1
(58) Field of Classification Search ............... 74/594.1, 74/594.4, 594.7; 403/230; 301/2.5
See application file for complete search history.

(56) References Cited

U.S. PATENT DOCUMENTS

| | | | |
|---|---|---|---|
| 3,554,585 A * | 1/1971 | Sorenson | 403/105 |
| 4,915,374 A * | 4/1990 | Watkins | 482/57 |
| 5,336,147 A * | 8/1994 | Sweeney, III | 482/57 |
| 5,586,472 A * | 12/1996 | Lin | 74/594.1 |
| 6,568,296 B1 * | 5/2003 | Lin | 74/594.1 |
| 6,874,387 B2 * | 4/2005 | Vaughn | 74/594.1 |
| 7,364,533 B2 * | 4/2008 | Baker | 482/57 |
| 7,771,325 B2 * | 8/2010 | Baker | 482/57 |
| 2010/0212454 A1 * | 8/2010 | Wang | 74/560 |

FOREIGN PATENT DOCUMENTS

JP       02127184 A  *  5/1990

* cited by examiner

*Primary Examiner* — Vicky Johnson

(57) ABSTRACT

A quick release device includes a crank having a first hole defined in one end thereof, the crank having a sixth hole opened on one lateral thereof, a fixing sleeve positioned in the first hole of the crank, a third hole opened at one end of the fixing sleeve, a fourth hole opened on the outside periphery of the fixing sleeve therethrough and corresponding to the sixth hole, the fourth hole communicating with the third hole, a quick release assembly partially received in the sixth hole, the quick release assembly having a second engaging rod, a fixing member and a rotating button, the second engaging rod received in the sixth hole, the fixing member connected to the crank and sleeved on the second engaging rod. When the user wants to release the pedal from the crank, the user just rotates the rotating button counterclockwise.

8 Claims, 6 Drawing Sheets

QUICK RELEASE DEVICE

CROSS-REFERENCE TO RELATED APPLICATION

This application is a Continuation-In-Part application of Ser. No. 12/404,330, filed 15 Aug. 2011, and entitled "QUICK RELEASE DEVICE", now pending.

BACKGROUND OF THE INVENTION

1. Field of the Invention

The present invention relates to a quick release device, and more particularly to a quick release device for a bicycle crank and a bicycle pedal.

2. Description of Related Art

A conventional quick release device in accordance with the prior art comprises a pedal, a fixing threaded sleeve and a crank arm. The pedal has one end formed with a rotation shaft which has a free end formed with a screw portion having an outer thread. The fixing threaded sleeve has a center formed with a screw bore screwed on the screw portion of the rotation shaft of the pedal. The fixing threaded sleeve has an outer wall protruded with two radially opposite locking flanges. The crank arm has a free end formed with a mounting hole for insertion of the fixing threaded sleeve. The mounting hole of the crank arm has a wall formed with two insertion guide grooves for insertion of the two locking flanges of the fixing threaded sleeve. Each of the two insertion guide grooves has one side formed with a locking recess for locking the respective locking flange of the fixing threaded sleeve by rotation of the fixing threaded sleeve. The locking recess of each of the two insertion guide grooves is distributed on a diameter of the mounting hole. However, the conventional quick release device still has one disadvantage as following:

When a user wants to release the pedal from the fixing threaded sleeve of the crank arm, the user has to use an additional hand tool for detaching, such as a screwdriver for detaching, thereafter the rotation shaft is loosened and the pedal is released from the fixing threaded sleeve of the crank arm. Therefore, the additional hand tool is necessary for the operation. In other words, the user must take the additional hand tool during the operation so that it is very inconvenient.

The present invention has arisen to mitigate and/or obviate the disadvantages of the conventional quick release device.

SUMMARY OF THE INVENTION

The main objective of the present invention is to provide an improved release device.

To achieve the objective, a quick release device includes a crank having a first hole defined in one end thereof and a second hole opened on one lateral thereof, the second hole communicating with the first hole, the crank further having a sixth hole opened on another lateral thereof, the sixth hole communicating with the first hole and having a threaded structure defined therein, a first engaging rod provided for inserted into the second hole, a fixing sleeve received in the first hole of the crank, a first groove defined on the outside periphery of the fixing sleeve, a third hole opened at one end of the fixing sleeve, a rubber ring mounted in the third hole, a fourth hole opened on the outside periphery of the fixing sleeve therethrough and corresponding to the sixth hole, the fourth hole communicating with the third hole, the first engaging rod inserted into the second hole and engaging with the first groove of the fixing sleeve so that the fixing sleeve is positioned in the first hole, a quick release assembly partially received in the sixth hole, the quick release assembly further comprising:

a second engaging rod received in the sixth hole, the second engaging rod having a head formed at one end thereof and a first threaded portion formed thereon, the cross-section of the head being greater than the cross-section of the second engaging rod, a fixing member having a eighth hole opened therethrough, the eighth hole having the threaded structure defined therein, the fixing member further having a second threaded portion formed at one end thereof, a rotating button connected to the second engaging rod and being not rotated relative to the second engaging rod.

Wherein, the fixing sleeve has a fifth hole opened at another end thereof and the fifth hole communicates with the third hole. The quick release device further comprising a pedal having a pedal spindle mounted at one end thereof, the pedal spindle having a second groove defined thereon and the second groove corresponding to the sixth hole, the pedal spindle further having an engaging protrusion formed at one end thereof and the engaging protrusion corresponding to the fifth hole, the pedal spindle inserted into the third hole so that the engaging protrusion is received in the fifth hole and is engaged with the fifth hole. The pedal spindle has a second incline surface being adjacent to one side of the second groove. A first incline surface is formed between the third hole and the fifth hole. A spring and the fixing member are sequentially sleeved on the second engaging rod. The rotating button has a ninth hole opened therethrough; the second engaging rod has a seventh hole opened at another end therethrough; a fixing rod passes thorough the ninth hole of the rotating button and the seventh hole of the second engaging rod. The sixth hole is perpendicular to the first hole; the fourth hole is perpendicular to the third hole.

Further benefits and advantages of the present invention will become apparent after a careful reading of the detailed description with appropriate reference to the accompanying drawings.

DETAILED DESCRIPTION OF THE INVENTION

Figure 1:
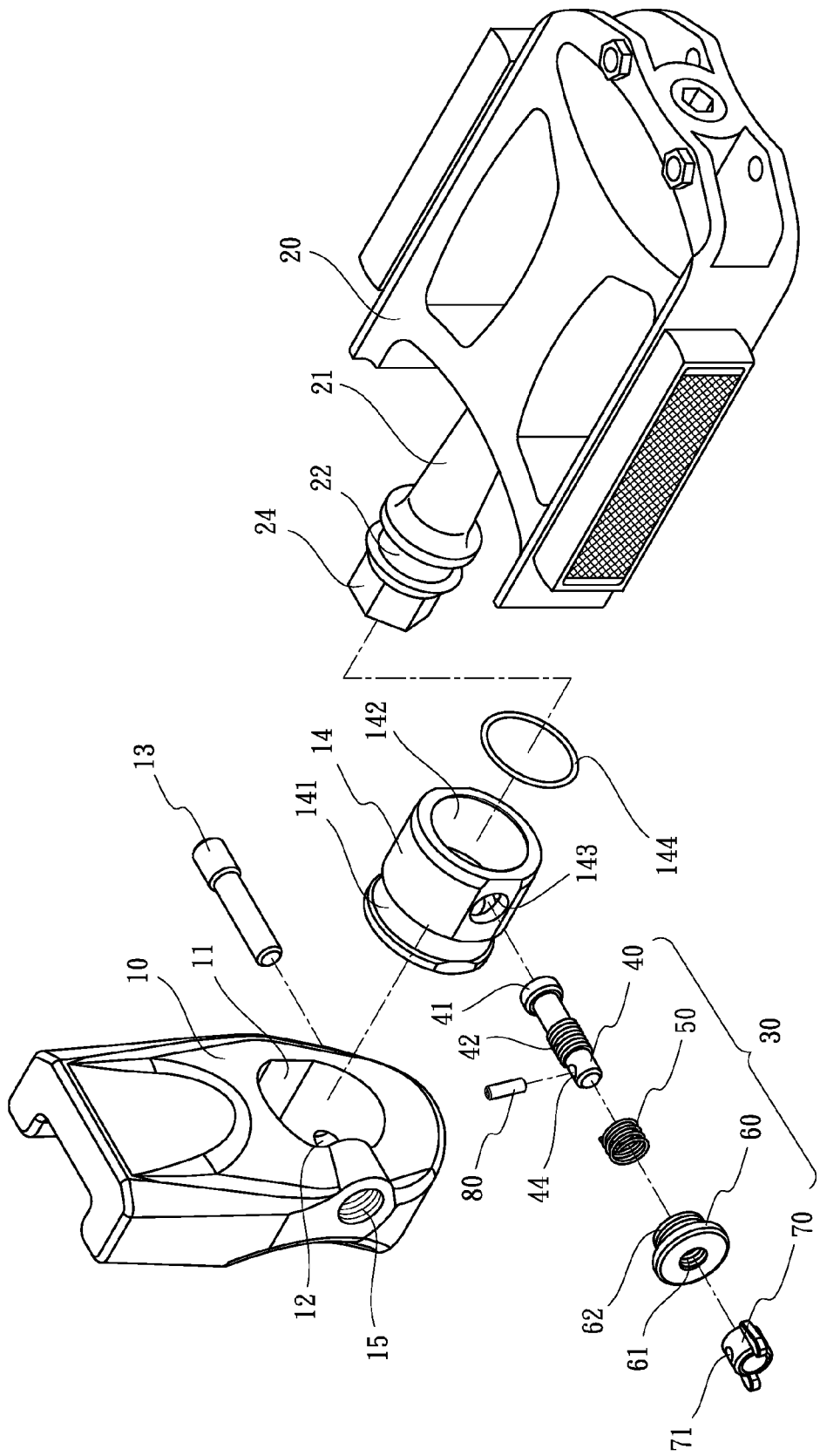
FIG. 1 is an exploded perspective view of a quick release device in accordance with the present invention.
Figure 2:
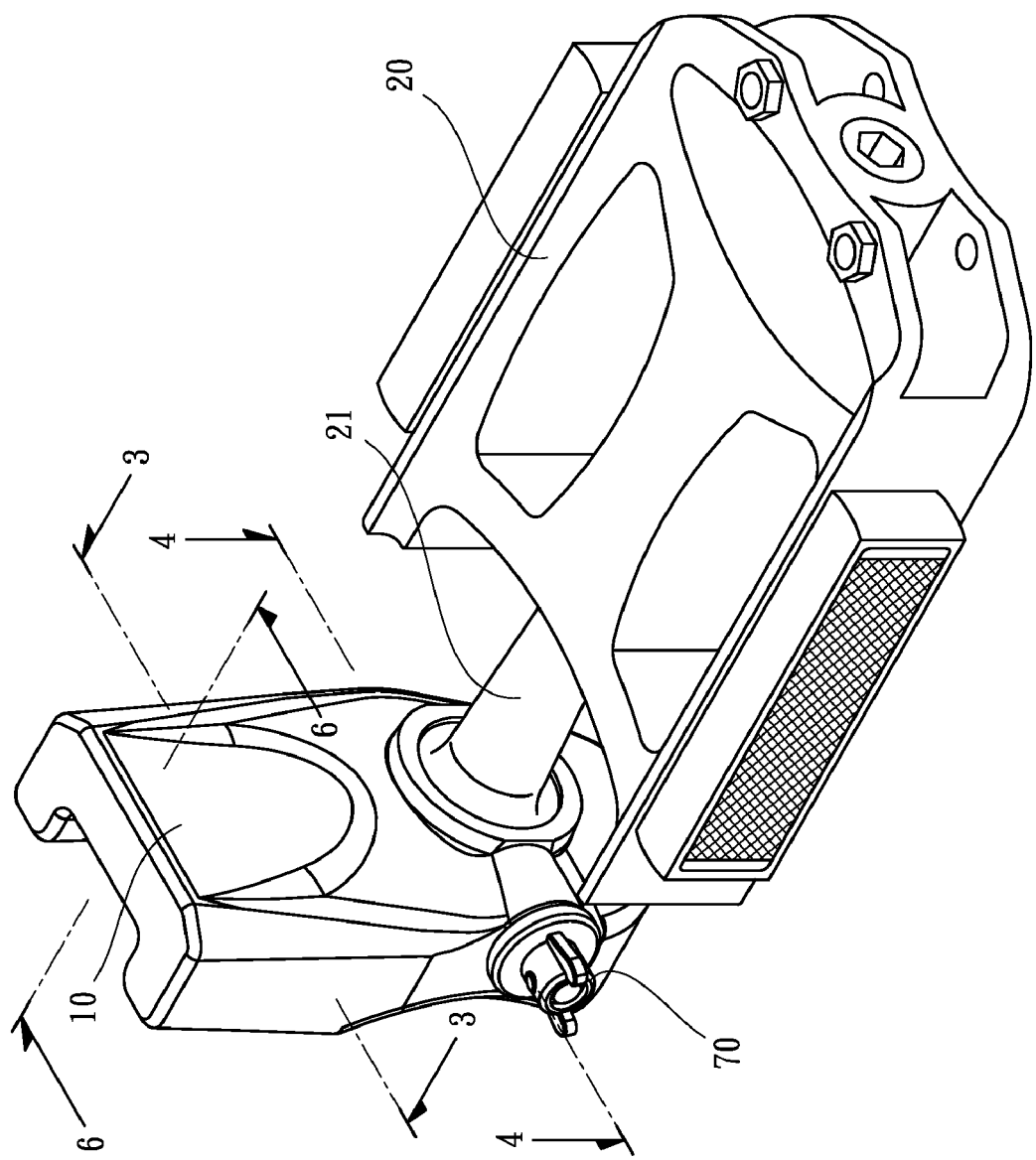
FIG. 2 is an assembled perspective view of the quick release device in accordance with the present invention.

Referring to the drawings and initially to FIGS. 1-5, a quick release device in accordance with the present invention comprises a crank 10, a fixing sleeve 14, a pedal 20 and a quick release assembly 30.

The crank 10 has a first hole 11 defined in one end thereof. The cranks 10 has a second hole 12 opened on one lateral side thereof. The second hole 12 communicates with the first hole 11. The crank 10 has a sixth hole 15 opened on another lateral side thereof. The sixth hole 15 communicates with the first hole 11 and is perpendicular to the first hole 11. The sixth hole 15 has a threaded structure defined therein. A first engaging rod 13 is provided for inserted into the second hole 12.

Figure 6:
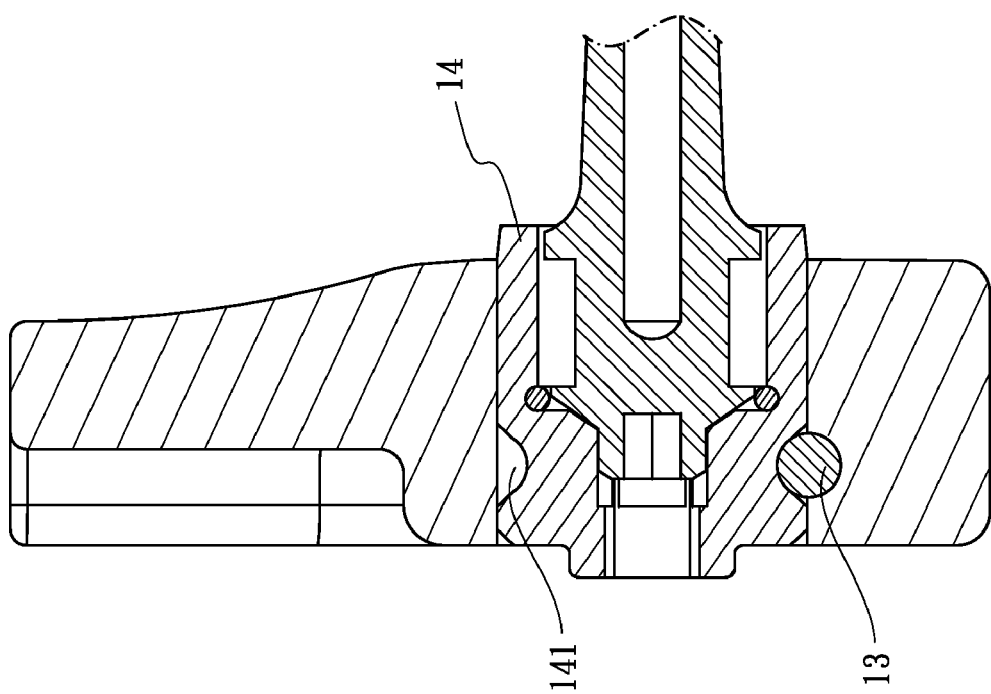
FIG. 6 is a partially cross-sectional view of the quick release device along the line 6-6 for showing a first engaging rod which engages with a first groove.

The fixing sleeve 14 is received in the first hole 11 of the crank 10. A first groove 141 is defined on the outside periphery of the fixing sleeve 14. A third hole 142 is opened at one end of the fixing sleeve 14. The fixing sleeve 14 has a fifth hole 146 opened at another end thereof The fifth hole 146 is hexagon-shaped and communicates with the third hole 142. A rubber ring 144 is mounted in the third hole 142. A first incline surface 145 is formed between the third hole 142 and the fifth hole 146. A fourth hole 143 is opened on the outside periphery of the fixing sleeve 14 therethrough and is corresponding to the sixth hole 15. The fourth hole 143 communicates with the third hole 142 and is perpendicular to the third hole 142. The first engaging rod 13 is inserted into the second hole 12 and engages with the first groove 141 of the fixing sleeve 14 so that the fixing sleeve 14 is positioned in the first hole 11 (as shown in FIGS. 1 and 6).

The pedal 20 has a pedal spindle 21 mounted at one end thereof The pedal spindle 21 has a second groove 22 defined thereon and corresponding to the sixth hole 15. The pedal spindle 21 has a second incline surface 25 being adjacent to one side of the second groove 22. The pedal spindle 21 has an engaging protrusion 24 formed at one end thereof and corresponding to the fifth hole 146. The engaging protrusion 24 is hexagon-shaped (the engaging protrusion 24 might be polygon-shaped in other embodiments). The pedal spindle 21 is inserted into the third hole 142 so that the engaging protrusion 24 is received in the fifth hole 146 and is engaged with the fifth hole 146. Therefore, the pedaling force of a user transmits from the pedal 20 to the crank 10.

The quick release assembly 30 is partially received in the sixth hole 15. The quick release assembly 30 has a second engaging rod 40, a spring 50, a fixing member 60, a rotating button 70 and a fixing rod 80. The second engaging rod 40 is received in the sixth hole 15. The second engaging rod 40 has a head 41 formed at one end thereof and has a seventh hole 44 opened at another end therethrough. The second engaging rod 40 further has a first threaded portion 42 formed between the head 41 and the seventh hole 44. The cross-section of the head 41 is greater than the cross-section of the second engaging rod 40. The fixing member 60 has a eighth hole 61 opened therethrough. The eighth hole 61 has a threaded structure defined therein. The fixing member 60 has a second threaded portion 62 formed at one end thereof The rotating button 70 has a ninth hole 71 opened therethrough. The fixing rod 80 is provided for connecting the rotating button 70 and the second engaging rod 40.

Figure 3:
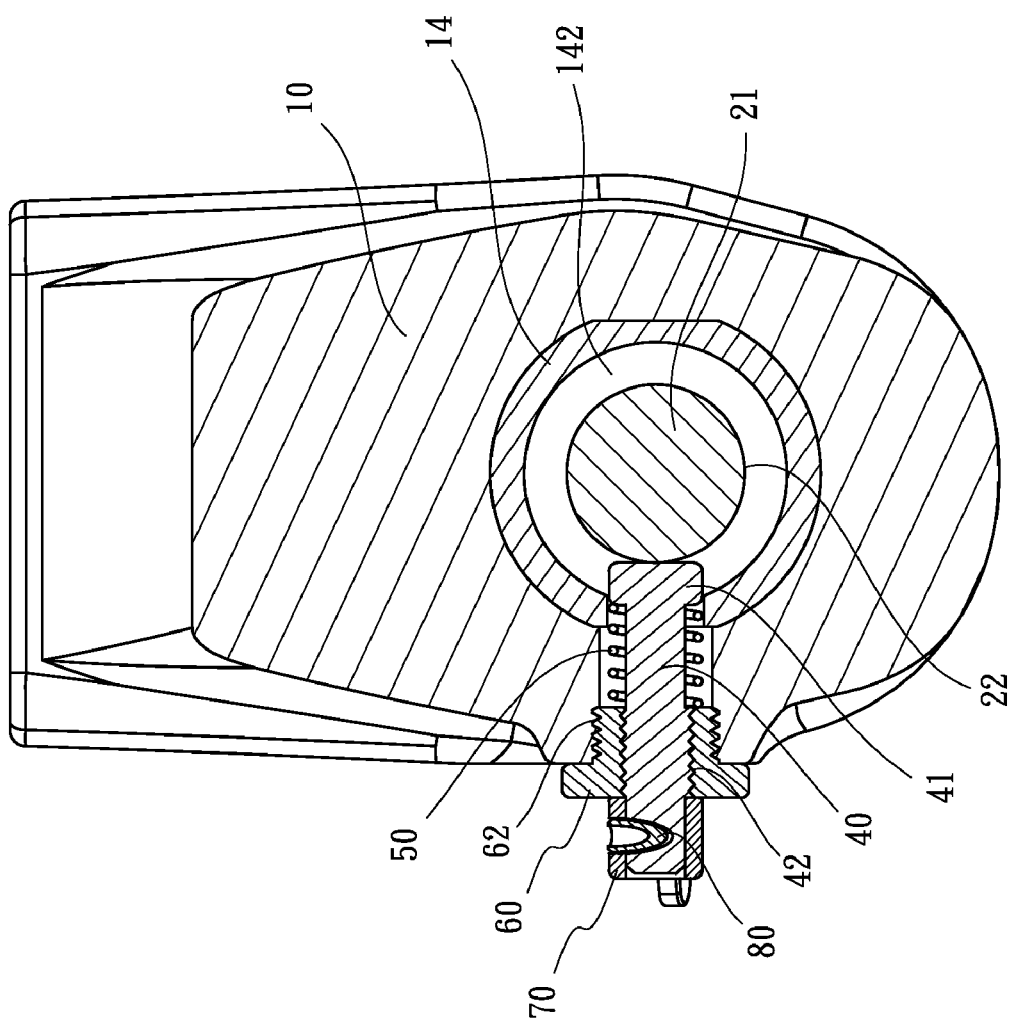
FIG. 3 is a partially cross-sectional view of the quick release device along the line 3-3.
Figure 4:
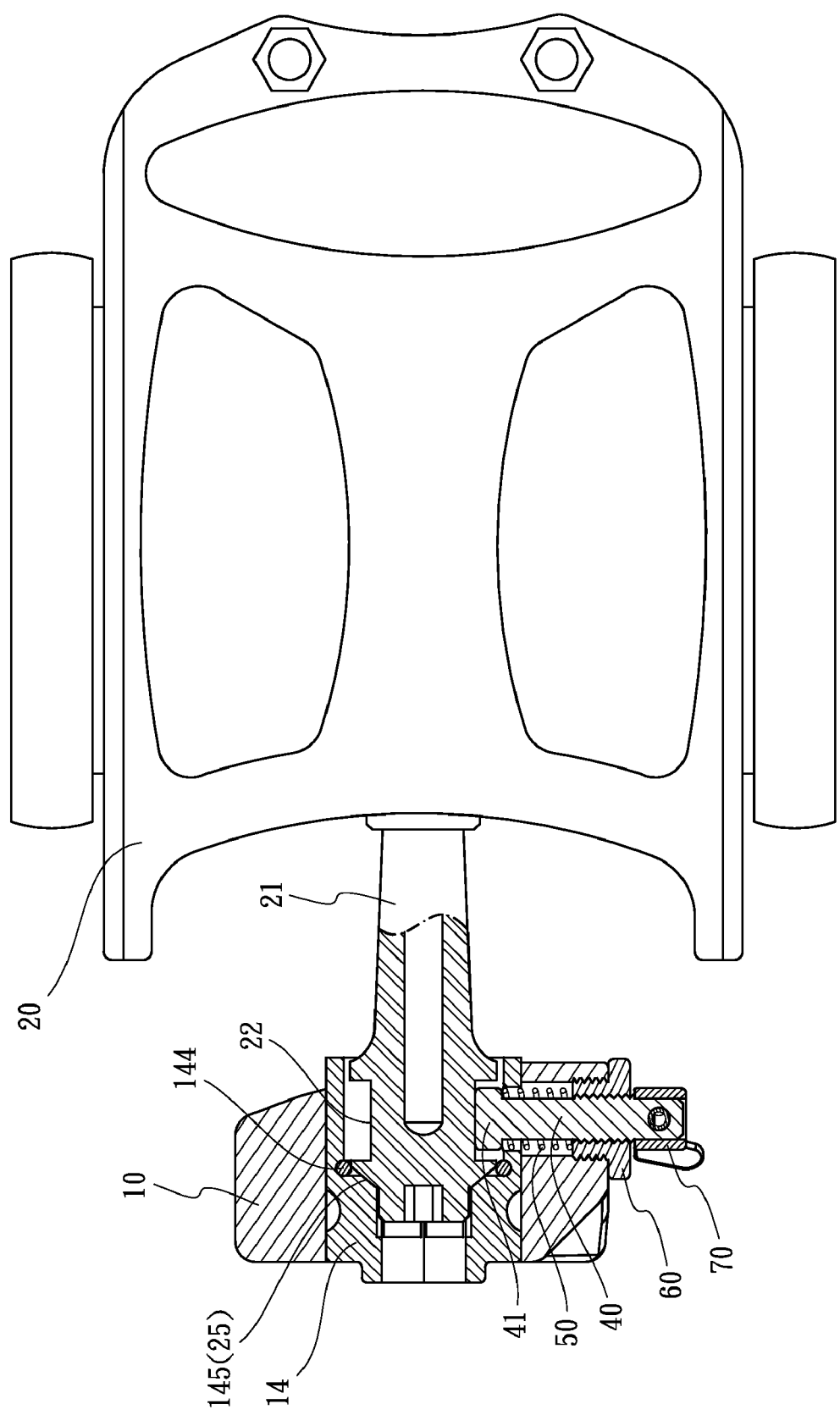
FIG. 4 is a partially cross-sectional view of the quick release device along the line 4-4 for showing a pedal connected to a crank.

Referring to FIGS. 3-4, when assembling the quick release assembly 30 into the crank 10, the head 41 of the second engaging rod 40 is inserted into the sixth hole 15 and the head 41 is engaged with the second groove 22 of the pedal 20. The spring 50 and the fixing member 60 are sequentially sleeved on the second engaging rod 40. The fixing member 60 is screwed on the first threaded portion 42 via the eighth hole 61. The second threaded portion 62 of the fixing member 60 is screwed into the sixth hole 15 tightly to mount the fixing member 60 to the crank 10 and to compress the spring 50. The rotating button 70 is connected to the second engaging rod 40. The fixing rod 80 passes thorough the ninth hole 71 of the rotating button 70 and the seventh hole 44 of the second engaging rod 40 so that the rotating button 70 cannot be rotated relative to the second engaging rod 40. Under this arrangement, one end of the compressed spring 50 is abutted against the head 41 and another end of the compressed spring 50 is abutted against the second threaded portion 62 of the fixing member 60, so that the elasticity of the compressed spring 50 prevents the first threaded portion 42 of the second engaging rod 40 from becoming loosed and the head 41 of the second engaging rod 40 is always engaged with the second groove 22 of the pedal 20 during rising. Furthermore, when the pedal spindle 21 is secured within the fixing sleeve 14, the second incline surface 25 of the pedal spindle 21 abuts against the first incline surface 145 and the rubber ring 144 of the fixing sleeve 14 so that the pedal spindle 21 is secured with the fixing sleeve 14 stably. Therefore, the pedal 20 is connected to the crank 10 firmly and safely.

Figure 5:
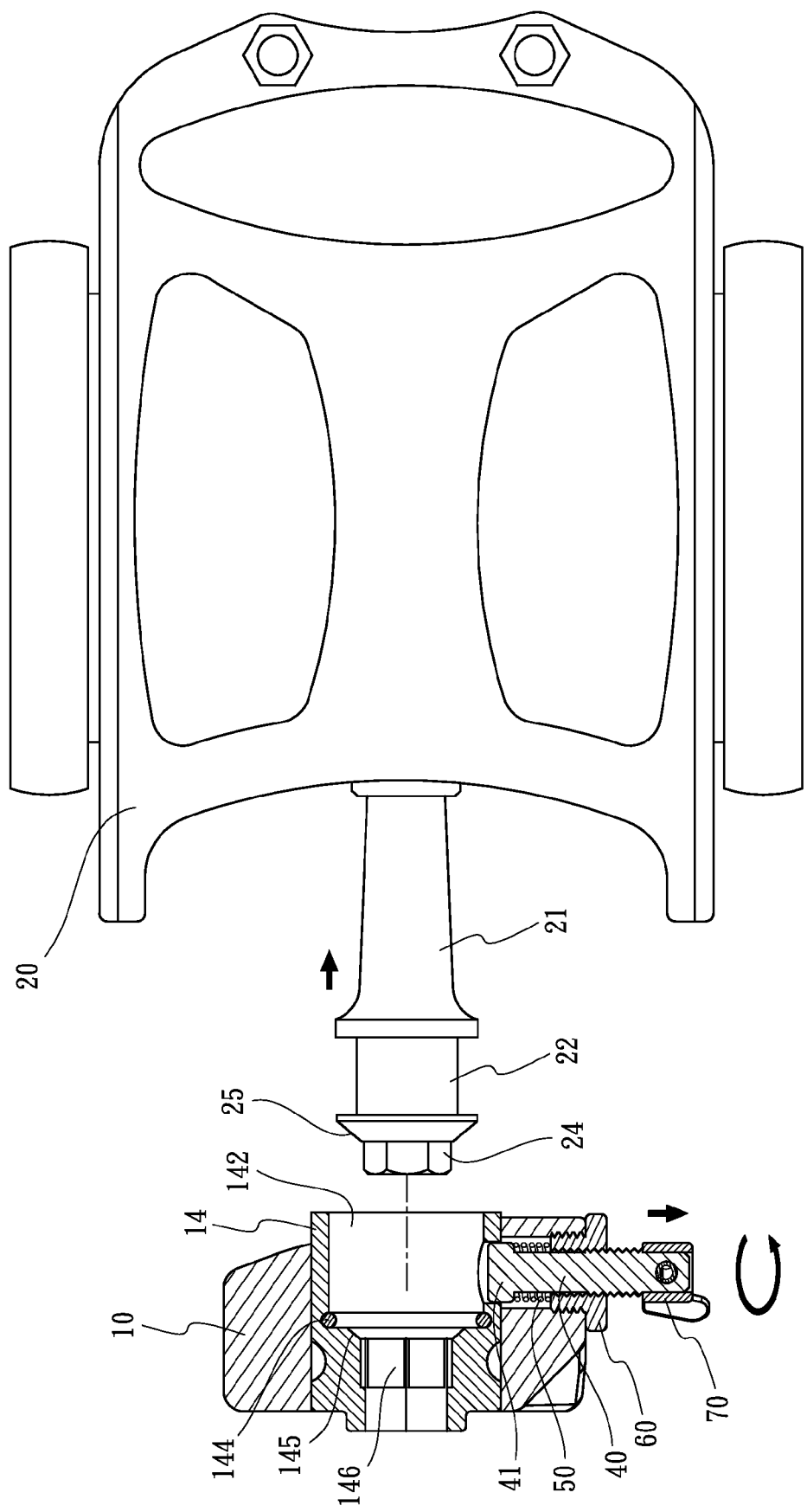
FIG. 5 is a partially cross-sectional view of the quick release device for showing the pedal released from the crank.

Referring to FIG. 5, when the user wants to release the pedal 20 from the crank 10, the user rotates the rotating button 70 counterclockwise and the second engaging rod 40 is moved away the second groove 22 by the rotation of the rotating button 70 until the head 41 of the second engaging rod 40 is disengaged with the second groove 22, thereafter the user pulls out the pedal spindle 21 of the pedal 20 from the fixing sleeve 14 of the crank 10 so as to finish the operation.

When the user wants to connect the pedal 20 to the crank 10, the user takes the pedal 20 and inserts the pedal spindle 21 into the third hole 142 until the engaging protrusion 24 of the pedal spindle 21 is completely engaged with the fifth hole 146 which is communicating with the third hole 142, thereafter the user rotates the rotating button 70 clockwise and the second engaging rod 40 is moved into the second groove 22 by the rotation of the rotating button 70 until the head 41 of the second engaging rod 40 is tightly engaged with the second groove 22 so that the operation is finished (as shown in FIG. 4).

Although the invention has been explained in relation to its preferred embodiment, it is to be understood that many other possible modifications and variations can be made without departing from the spirit and scope of the invention as hereinafter claimed.

What is claimed is:

1. A quick release device comprising:
a crank having a first hole defined in one end thereof and a second hole opened on one lateral side thereof, the second hole communicating with the first hole, the crank further having a sixth hole opened on another lateral side thereof, the sixth hole communicating with the first hole and having a threaded structure defined therein, a first engaging rod provided for inserted into the second hole;
a fixing sleeve received in the first hole of the crank, a first groove defined on the outside periphery of the fixing sleeve, a third hole opened at one end of the fixing sleeve, a rubber ring mounted in the third hole, a fourth hole opened on the outside periphery of the fixing sleeve therethrough and corresponding to the sixth hole, the fourth hole communicating with the third hole, the first engaging rod inserted into the second hole and engaging with the first groove of the fixing sleeve so that the fixing sleeve is positioned in the first hole; and
a quick release assembly partially received in the sixth hole, the quick release assembly further comprising:
a second engaging rod received in the sixth hole, the second engaging rod having a head formed at one end thereof and a first threaded portion formed thereon, the cross-section of the head being greater than the cross-section of the second engaging rod;
a fixing member having a eighth hole opened therethrough, the eighth hole having the threaded structure defined therein, the fixing member further having a second threaded portion formed at one end thereof; and a rotating button connected to the second engaging rod and being not rotated relative to the second engaging rod.

2. The quick release device as claimed in claim 1, wherein the fixing sleeve has a fifth hole opened at another end thereof and the fifth hole communicates with the third hole.

3. The quick release device as claimed in claim 2 further comprising a pedal having a pedal spindle mounted at one end thereof, the pedal spindle having a second groove defined thereon and the second groove corresponding to the sixth hole, the pedal spindle further having an engaging protrusion formed at one end thereof and the engaging protrusion corresponding to the fifth hole, the pedal spindle inserted into the third hole so that the engaging protrusion is received in the fifth hole and is engaged with the fifth hole.

4. The quick release device as claimed in claim 3, wherein the pedal spindle has a second incline surface being adjacent to one side of the second groove.

5. The quick release device as claimed in claim 4, wherein a first incline surface is formed between the third hole and the fifth hole.

6. The quick release device as claimed in claim 1, wherein a spring and the fixing member are sequentially sleeved on the second engaging rod.

7. The quick release device as claimed in claim 1, wherein the rotating button has a ninth hole opened therethrough; the second engaging rod has a seventh hole opened at another end therethrough; a fixing rod passes thorough the ninth hole of the rotating button and the seventh hole of the second engaging rod.

8. The quick release device as claimed in claim 1, wherein the sixth hole is perpendicular to the first hole; the fourth hole is perpendicular to the third hole.

\* \* \* \* \*